Aug. 7, 1962 K. PRESTON, JR 3,048,709

TRANSISTOR-CORE PULSE GENERATOR

Filed Sept. 25, 1958

INVENTOR
K. PRESTON, JR
BY
Harold C. Herman
ATTORNEY

United States Patent Office 3,048,709

Patented Aug. 7, 1962

3,048,709

TRANSISTOR-CORE PULSE GENERATOR

Kendall Preston, Jr., Summit, N.J., assignor to Bell Telephone Laboratories, Incorporated, New York, N.Y., a corporation of New York Filed Sept. 25, 1958, Ser. No. 763,230
8 Claims. (Cl. 307—88.5)

Figure 1:
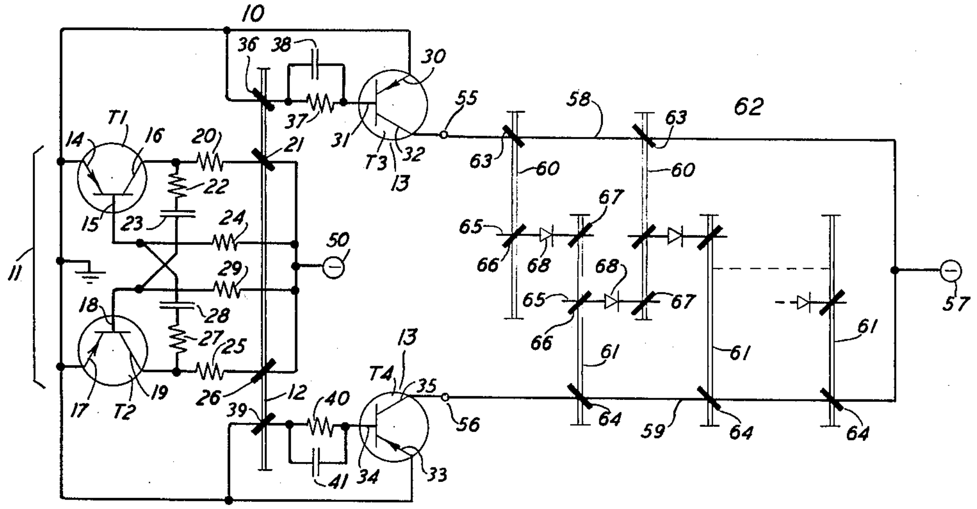

This invention relates to pulse generators and more particularly to pulse generators for providing two-phase output pulses to a load, such as a plurality of magnetic cores.

Magnetic cores having substantially rectangular hysteresis characteristics have been suggested for a wide variety of logic and memory circuits. Advantageously such cores should be driven to the two remanent states of magnetization, which are generally referred to as the "set" and "reset" states, by constant current pulse sources. Such sources have usually required vacuum tube pulse generators with a concomitant relatively high power dissipation requirement.

It would therefore be desirable to replace these high power vacuum tube pulse generators for core circuits with pulse generators utilizing less power. Such lower power pulse generators may utilize transistor circuitry for the pulse-switching and magnetic cores themselves to provide the output pulses for the load circuits. Circuits of this type have inherently long life and reliability and tend to reduce the over-all number of necessary components.

However, prior pulse generators employing magnetic cores having substantially rectangular hysteresis loops have exhibited certain undesirable characteristics. A typical type of load to be supplied with output pulses by the pulse generator might comprise a magnetic core shift register circuit, and, while it is to be understood that my invention is not to be considered as limited to such a load, it will be helpful in the following discussion to describe my invention with respect to this particular load. A shift register circuit requires two-phase drive pulses. Priorly when magnetic cores have been utilized in the pulse generating circuitry for the two-phase drive or advance pulses, the slightly different switching characteristics of the magnetic cores utilized in the pulse generator have caused the pulse generator circuit to produce output pulse shapes for the two phases which may differ in amplitude, form, and duration. In applications wherein each pulse is to follow a pulse of the other phase by an exact interval, this difference in characteristics may destroy the timing synchronization between pulses. Moreover, when a two-phase pulse generator is employed to drive magnetic core circuitry, apparently off-state output switches of the generator may be caused to conduct by voltages induced by the driven core circuitry. These induced voltages overcome the biasing potentials employed to keep the switches in the off state and cause them to conduct and produce false output signals. This spurious conduction is called conduction due to voltage enhancement.

It is an object of this invention to provide an improved two-phase pulse generator having a relatively small number of circuit components and capable of producing accurately timed, identical output pulses for each output phase.

A further object of this invention is to provide a two-phase pulse generator wherein conduction due to voltage enhancement is eliminated.

Briefly, these objects are accomplished in accordance with aspects of this invention by the utilization of a single magnetic core displaying a substantially rectangular hysteresis characteristic to control the output of a two-phase pulse generator. A transistor multivibrator is employed to drive the core into either of its two states of magnetization, that is, to set or reset the core, by means of oppositely wound windings on the core and included in the multivibrator circuitry. The windings function to set and reset the core in response to the alternate multivibrator output phases. The core has a number of output windings which transmit to transistor output switches pulses caused by switching the condition of the core. Since all output switches are controlled by the same core, there is no variance in core switching characteristics which would cause output pulse and timing distortion.

In one specific illustrative embodiment wherein the pulse generator circuit is to provide two-phase output pulses to a single magnetic core shift register circuit, two output windings are provided on the generator magnetic core. These output windings are wound on the core in opposite senses so that a set pulse produces an output pulse in one winding, causing its associated transistor output switch to operate, and a reset pulse similarly causes the transistor output switch associated with the other output winding to operate; in other specific embodiments more than two output windings may be provided, certain of the windings, such as half, being wound in one sense and the other windings in the other sense.

At the same time that an output pulse is induced in one output winding to enable its associated switch, an opposite polarity disabling pulse is induced in the oppositely wound output winding. These disabling pulses are of such an amplitude as further to preclude voltages induced in the load circuitry from operating the off-state transistor switch. Accordingly, distortion of the output wave forms or false operation due to voltage enhancement is eliminated.

It is a feature of this invention that a single magnetic core displaying a substantially rectangular hysteresis characteristic is employed to control both output phases of a two-phase pulse generator, thereby providing accurately timed, identical output pulses for each phase. The core is driven by a multivibrator circuit through input windings so wound that pulses of one phase of the multivibrator set the core and pulses of the other phase reset the core.

A further feature of this invention is that output windings on a magnetic core controlling the output of a two-phase pulse generator are so wound and so connected to output switches that setting the core operates some of the switches while disabling the others and thereafter resetting the core operates the previously disabled switches while disabling the previously operated ones.

It is another feature of this invention that the output switches are transistors having their bases connected to the output windings of the single magnetic core and their collectors to the associated load circuitry, voltage enhancement at the collectors due to induced voltages in the associated load circuitry, which may comprise magnetic core circuits, being prevented from falsely operating a transistor switch due to the disabling potential applied to the base of the non-conducting transistor by the associated output winding on the magnetic core. Further in accordance with this feature of the inventon the transistor bases are connected to the associated magnetic core output windings through a resistor-capacitor network.

It is still another feature of this invention that interaction between the output transistor switches and the transistor multivibrator due to the common utilization of a single magnetic core element is prevented by proper arrangement of the multivibrator circuit.

Figure 2:
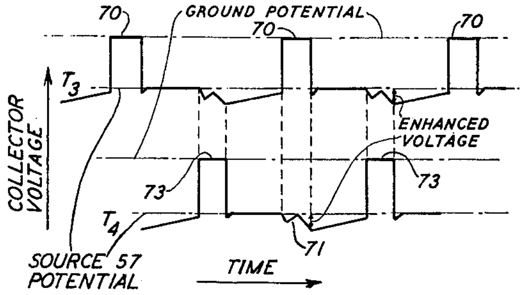
Figure 3:
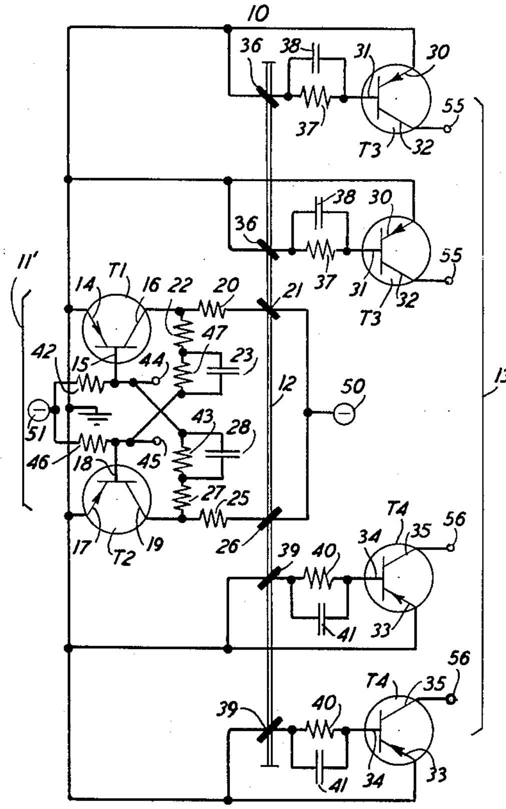

These and other objects and features of this invention will be better understood upon consideration of the following detailed description and the accompanying drawing, in which:

FIG. 1 is a schematic representation of a two-phase pulse generator illustrative of one specific embodiment of the invention employing an astable transistor multivibrator and applying driving pulses to a shift register circuit;

FIG. 2 is a time diagram of the collector voltages for the two transistor switches of the embodiment of FIG. 1, illustrating particularly the variation in collector voltage due to voltage enhancement; and FIG. 3 is a schematic representation of a two-phase pulse generator illustrative of another specific embodiment of this invention employing a bistable transistor multivibrator and multiple identical transistor output switches.

Referring now to FIG. 1, there is shown a two-phase pulse generator circuit 10 comprising a transistor multivibrator 11, a magnetic core 12 having a substantially rectangular hysteresis loop, and an output section 13. The multivibrator 11 is self-starting and free running and comprises a p-n-p junction transistor $T_1$ having an emitter 14, a base 15 and a collector 16, and a p-n-p junction transistor $T_2$ having an emitter 17, a base 18 and a collector 19. Transistors $T_1$ and $T_2$, which may advantageously be of a type having a power rating of approximately 100 milliwatts, are alternately conductive. The emitters 14 and 17 are each connected to ground and the base 15 of transistor $T_1$ is biased by a source of negative potential 50 through a resistance 24. Collector 16 of the transistor $T_1$ is biased in a normal manner by the source of negative potential 50 through a series connection comprising a resistance 20 and a winding 21.

The winding 21 is wound about the magnetic core 12 in a first direction, as shown in the drawing by the conventional mirror symbolism described by M. Karnaugh in an article entitled, "Pulse Switching Circuits Using Magnetic Cores," Proceedings of the I.R.E., May 1955, pages 570–583. By this symbolism it may be established from FIG. 1 that a positive current from the collector 16 of the transistor $T_1$ toward winding 21 establishes flux through core 12 in a downward or set direction, as viewed in the drawing. This downward flux induces positive current flow to the left from windings wound in the sense of winding 21 and positive current flow to the right in windings wound in the opposite sense. Assuming that the transistor $T_1$ has just been placed in its operating or saturated condition, a voltage is impressed across the resistance 20 and the winding 21 and acts to set the core 12. The number of turns of winding 21 are sufficient to provide the requisite setting magnetomotive force for the core 12. Control of the switching time of core 12 may be obtained by varying the voltage across winding 21 by changing the number of turns of winding 21, varying the voltage supplied by source 50, or by changing the resistance 20.

When transistor $T_1$ is operated or becomes conductive, the voltage at collector 16 becomes more positive, and a positive pulse is provided to the base 18 of transistor $T_2$ through a resistance 22 and a serially connected capacitance 23 causing transistor $T_2$ to become non-conductive. The base 18 of the transistor $T_2$ is biased by the source 50 through a resistance 29.

When transistor $T_2$ becomes non-conductive, the capacitance 23 tends to charge toward the negative potential furnished by source 50 through the resistance 29. When this potential reaches a predetermined point, transistor $T_2$ operates, raises the potential at the collector 19 and applies a potential across a resistance 25 and a winding 26 which are connected to the biasing source 50. The operation of transistor $T_2$, by raising the potential of the collector 19, also applies a positive pulse to the base 15 of transistor $T_1$ through a resistance 27 and a serially connected capacitance 28 causing transistor $T_1$ to become non-conductive. The time required for the potential build-up at capacitances 23 and 28 and thus the pulse repetition rate of multivibrator 11 is controlled by the magnitude of capacitances 23 and 28. The voltage across winding 26, which is wound on core 12 in a sense opposite to that of winding 21, causes the magnetic condition of core 12 to switch to the reset condition.

By slight changes in circuitry, well known in the art, the multivibrator 11 may be made to operate as a monostable rather than an astable circuit. The application of a negative pulse to base 15 will then cause the multivibrator 11 to operate through a single cycle, transistor $T_1$ first operating and causing transistor $T_2$ to be non-conductive and transistor $T_2$ then operating and causing transistor $T_1$ to be non-conductive. As is hereinafter described with reference to FIG. 3, the multivibrator 11 may also be bistable.

As explained above, conduction or operation of transistor $T_1$ sets the core 12 while conduction or operation of transistor $T_2$ resets core 12. Setting core 12 induces voltages which tend to produce a positive current to the left in a winding 36 and to the right in a winding 39, and resetting the core 12 reverses these voltages and the associated currents. The windings 36 and 39 are part of an input circuit arrangement of the output section 13 which comprises a p-n-p junction transistor $T_3$ having an emitter 30, a base 31 and a collector 32, and a second p-n-p junction transistor $T_4$ having an emitter 33, a base 34 and a collector 35. The transistors $T_3$ and $T_4$ may advantageously be of a type having a power rating of approximately 500 milliwatts. The emitters 30 and 33 are each connected to ground and the base 31 of transistor $T_3$ is connected through a parallel network comprising a resistance 37 and a capacitance 38 to one side of the winding 36, the other side of which is connected to ground.

In the specific illustrative embodiment of my invention depicted in FIG. 1 the load circuitry is a magnetic core shift register circuit 62, of a type known in the art, which has its advance leads 58 and 59 connected, respectively, to the collectors 32 and 35 of transistors $T_3$ and $T_4$ at output terminals 55 and 56. Shift register 62 includes a first plurality of magnetic cores 60 having advance windings 63 connected to advance lead 58 and thus arranged to be driven by the one-phase pulses from transistor $T_3$ and a second plurality of magnetic cores 61 having advance windings 64 connected to advance lead 59 and thus arranged to be driven by the alternate phase pulses from transistor $T_4$. Coupling loops between individual of the two groups of cores are provided by leads 65 connecting output windings 66 and input windings 67; a diode 68 is advantageously included in the coupling loop, as is known in the art. The information input and output windings to the shift register 62 are not shown but may be of any of the types known in the art, including serial and parallel input and output windings.

When the core 12 is set by the operation of transistor $T_1$, the current induced in winding 36 is such as to cause transistor $T_3$ to saturate and apply approximately ground potential at collector 32, thereby causing an output pulse 70, as seen in FIG. 2, to appear at output terminal 55. The collectors 32 and 35 of transistors $T_3$ and $T_4$ are biased by a source 57 of negative potential connected in common to the advance leads 58 and 59 of the shift register circuit 62. The impedance of the network comprising the resistance 37 and the capacitor 38 connected between the output winding 36 and the base 31 of transistor $T_3$ is such as to allow a large amount of current to be delivered to the base 31 when the core 12 begins to switch and subsequently to reduce this current to a value just enough to hold transistor $T_3$ in operation after the capacitance 38 is charged. The capacitance is of such a value that after the core 12 has finished switching, capacitance 38 discharges to produce a rapid turn-off of transistor $T_3$ by drawing reverse base current. In this manner, when the core 12 is set, the transistor $T_3$ first becomes conductive and then under control of the capacitance 38 after termination of the switching interval becomes non-conductive.

Conduction of transistor $T_3$ applies pulse 70 to advance lead 58 and thus, through advance windings 63, switches one or more of the cores 60 in the shift register circuit 62, thereby transferring any information stored therein to the cores 61 through the coupling loops 65. This information transfer requires, of course, switching of the cores 61 which induces a reverse voltage in advance windings 64, causing this voltage to appear on lead 59 and thus at collector 35 of transistor $T_4$. This voltage, which is herein referred to as the enhanced voltage, is depicted at 71 in FIG. 2. In one specific illustrative embodiment wherein the collectors were normally at approximately −10 volts, due to source 57, and output pulses 70 and 73 rose to approximately ground potential, the enhanced voltage was found to be of the order of 4 to 6 volts, thereby making the possible collector potential −16 volts. This negative voltage swing may be sufficient to cause conduction in transistor $T_4$ at this time, even though this transistor is intended to be non-conductive during conduction of transistor $T_3$. This can particularly be seen when it is appreciated that there is no permanent bias voltage applied to the base of transistor $T_4$ to maintain the transistor in the off or non-conducting condition.

In accordance with an aspect of my invention, during the period that the core 12 is being switched to the set condition, a normalizing or disabling voltage is induced in winding 39 and applied to the base 34 of transistor $T_4$. This disabling voltage forces transistor $T_4$ further into cut-off and counterbalances the enhanced voltage 71 at the collector so that the collector-base voltage still remains insufficient to cause conduction of transistor $T_4$. The winding 39, in this manner, provides an additional reverse-biasing potential as a safety measure to prevent conduction due to voltage enhancement.

In a like manner, resetting of the core 12 operates the transistor $T_4$ and inhibits the conduction of the transistor $T_3$. Winding 36 is so wound that the voltage induced therein during resetting core 12 biases transistor $T_3$ further into cut-off. Winding 39 is so wound as to cause conduction of transistor $T_4$ during resetting. Saturating current is drawn from the base of transistor $T_4$ during resetting through a parallel network comprising a resistance 40 and a capacitance 41 which are chosen in the same manner and operate in the same manner as the resistance 37 and the capacitance 38.

As can be seen in FIG. 2, the two-phase output pulses 70 and 71 are substantially identical in form, amplitude, and duration as they are all controlled by the single magnetic core 12, thereby preventing deviations in core characteristics affecting the output pulses. Similarly, while FIG. 2 depicts collector voltage, collector current is not depicted, there being no collector or output current at one output terminal due to an output pulse at the other output terminal because of voltage enhancement, for the reasons set forth above.

The repetition rate of the pulse generator is determined by the timing of the multivibrator 11, while pulse duration is determined by the switching time of the single magnetic core 12. When utilized to provide the two-phase drive currents for a magnetic core load circuit, the pulse generator can function as a constant current source without any large swamping resistances placed in series with the output terminals because the output core load circuitry presents the same impedance to the pulse generator during the pulses of each phase, thereby assuring uniform pulse excitation.

In one specific illustrative embodiment the pulse generator had a repetition rate of 33 kilocycles, the output pulse duration was 5 microseconds with a maximum rise and fall time of 20 percent of the pulse duration, and the output pulse was of approximately 200 milliamperes. In order to produce the required fast rise and fall times, the RC coupling networks comprising resistor 37 and capacitor 38, for transistor $T_3$, and resistor 40 and capacitor 41, for transistor $T_4$, are utilized between the output windings 36 and 39 and the bases of the respective transistors, as described above. The transfer impedance of this network is low at high frequencies so as to permit a large amount of current to be delivered to the base of the transistor as the magnetic core begins to switch. This causes a rapid turn-on of the transistor switch. The low frequency impedance of the coupling network determines the amount of base current which flows after turn-on is effected. This current is made appreciably smaller than the turn-on current to avoid oversaturating the transistor. After the magnetic core has finished switching, the discharge of the network capacitor, as described above, draws reverse base current from the transistor, thus producing a rapid turn-off.

In accordance with an aspect of my invention the single magnetic core 12 is utilized for both phase outputs and thus is associated with both outputs from the multivibrator circuit. Before switching the magnetic core, the multivibrator will have passed through its regenerative feedback interval. Because both transistors are conducting during this interval, currents flowing in the windings 21 and 26 tend to cancel each other. Also, collector current from the transistor which is turning on is partially shunted by the low reverse base impedance of the transistor that is turning off. Thus, the magnetic core is not appreciably affected during the regenerative feedback interval. Further, at the end of the regenerative feedback interval and the beginning of the switching interval of the multivibrator the voltage across capacitor 23 or 28 is essentially zero; accordingly, the resistor 22 or 27 in series with this capacitor prevents the magnetic core from being shunted by the small base-emitter impedance of the on or conducting transistor.

Referring now to FIG. 3, there is depicted another specific embodiment of my invention for providing more than one distinct output pulse in each output phase and wherein the drive multivibrator is different from that of FIG. 1; components in FIG. 3 which are similar to those in FIG. 1 are given the same reference designations to simplify the description of this embodiment.

The pulse generator circuit 10, shown in FIG. 3, includes a transistor multivibrator 11′, a square hysteresis loop magnetic core 12, and an output section 13. The multivibrator 11′ in FIG. 3 is bistable instead of astable and differs specifically from that of FIG. 1 in the addition of a resistance 47 paralleling the capacitance 23, the addition of a resistance 43 paralleling the capacitance 28, the removal of the resistances 24 and 29, the addition of a source of potential 51 biasing the base 15 through a resistance 42 and the base 18 through a resistance 46, in the addition of an input lead 44 to base 15 and an input lead 45 to base 18.

A negative pulse of appropriate amplitude applied at input lead 44 causes the transistor $T_1$ to operate and set the core 12, while a negative pulse at the input lead 45 causes the transistor $T_2$ to operate and reset the core 12. It is apparent that if a series of negative pulses are applied at either of input leads 44 or 45, only the first pulse of that series will cause an output at the output section 13 until a pulse has been applied to the other input lead 45 or 44 to switch the magnetic condition of core 12. Alternate equally spaced input pulses applied at input leads 44 and 45 produce output wave forms as shown in FIG. 2 of the drawing at the collectors 32 and 35. Duplication of transistor output switches including transistors $T_3$ and $T_4$ allows identical outputs to be realized in cases where such outputs are required. Four output switches are shown in FIG. 3. The output wave forms of FIG. 2 are descriptive of the outputs realized at collectors 32 and 35 of FIG. 3, as well as of FIG. 1. Each of transistors $T_3$ and $T_4$ is so connected that an additional voltage is applied to its base 31 or 34 in the off-state condition when an output switch of the alternate phase is operated to hold it out of operation and thus eliminate conduction due to voltage enhancement.

It is to be understood that the above-described arrangements are illustrative of the application of the principles of the invention. For example, it is apparent that other multivibrator circuits including those employing n-p-n transistors could be utilized without deviating from the inventive concept of my circuit. Numerous other arrangements may, therefore, be devised by those skilled in the art without departing from the spirit and scope of the invention.

What is claimed is:

1. A two-phase pulse generator for driving close tolerance magnetic core circuitry having feedback paths interconnecting opposite phases comprising a magnetic core having set and reset conditions, a transistor multivibrator having oppositely wound windings on said core for applying set and reset pulses to said core, two transistor switches, each of said switches having an input terminal and an output terminal, two oppositely wound output windings on said core connected individually to said input terminals for operating one of said transistor switches when said core is set by said multivibrator and the other of said switches when said core is reset by said multivibrator, and means for applying an output potential at said output terminal of either operated one of said switches.

2. A two-phase pulse generator comprising a magnetic core exhibiting a substantially rectangular hysteresis characteristic; a first plurality of windings wound on said core in one direction; a second plurality of windings wound on said core in a direction opposite to said first plurality of windings; transistor multivibrator means connected to one winding of each of said first and said second pluralities of windings for setting and resetting said core; switching means having input means connected to the remaining ones of said pluralities of windings, and output means; and means controlled by said switching means for applying a potential at some of said output means when said multivibrator means operates in either direction.

3. A pulse generator comprising a magnetic core having set and reset conditions, a first plurality of windings wound on said core in a first sense, a second plurality of windings wound on said core in an opposite sense, a two-phase transistor multivibrator having an output terminal for each phase, one of said output terminals being connected to one of said windings, of said first plurality of windings for setting said core, the other of said outer terminals being connected to one of said windings of said second plurality of windings for resetting said core, a plurality of transistors each having an emitter, a base, and a collector, said bases being individually connected to said windings in said first and said second pluralities of windings which are not connected to said output terminals of said multivibrator, potential means connected to each of said emitters, means including said potential means and said windings in said first plurality of windings which are connected to said bases for applying an output potential at the associated ones of said collectors when said core is set, and means including said potential means and said windings in said second plurality of windings which are connected to said bases for applying an output potential to the associated ones of said collectors when said core is reset.

4. A two-phase pulse generator for driving close tolerance magnetic core circuitry having feedback paths interconnecting opposite phases comprising a two-state magnetic core, transistor multivibrator means for placing said core in a first and a second state, a plurality of two-state output switches, and means for eliminating conduction due to voltage enhancement at said output switches including windings wound on said core and selectively connected to said output switches for providing operative pulses to some of said output switches and disabling pulses to the rest of said output switches, some of said windings being wound in a first direction and some of said windings being wound in a second direction in such a manner that said multivibrator means placing said core in either of said states produces currents in said windings wound in said first direction opposite those produced in said windings wound in said second direction.

5. A two-phase pulse generator comprising a single magnetic core displaying a substantially rectangular hysteresis characteristic and having two stable states; transistor multivibrator means for placing said core in each of said states comprising a pair of transistor switches having input and output means, potential source means, a resistance and a winding wound on said core in a first direction serially connecting said output means of one of said transistors and said potential source means, a resistance and a winding wound on said core in a second direction serially connecting said output means of the other of said transistors and said potential source means, and means including said input means of each of said transistors for alternately operating said transistors thereby applying a potential across said resistance and said winding connected to the output means of the operated one of said transistors; and a plurality of transistor output switches each comprising a transistor having an emitter, a base and a collector, a source of potential connected to said emitter, an output winding wound on said core, and a resistance and a capacitance parallelly connected and joining said output winding to said base, half of said output windings wound in said first direction and half of said output windings wound in said second direction whereby changing the state of said core to one of said states operates a first half of said transistors to change the potential condition at said collectors thereof and disables a second half of said transistor and changing said core to the other of said states disables said first half of said transistors and operates said second half.

6. A two-phase pulse generator for delivering substantially identical pulses in each phase to magnetic core load circuitry comprising a magnetic core having a set and a reset remanent state, a pair of oppositely wound input windings and a pair of oppositely wound output windings on said core, transistor multivibrator means having a first output connected to one of said input windings and a second output connected to the other of said input windings, a first transistor switch connected to one of said output windings and enabled by said transistor multivibrator means switching said core to one of said states and disabled by said transistor multivibrator means switching said core to the other of said states and a second transistor switch connected to the other of said output windings and enabled by said transistor multivibrator means switching of said core to said other state and disabled by said transistor multivibrator means switching said core to said one state.

7. A two-phase pulse generator for delivering substantially identical pulses in each phase to magnetic core load circuitry comprising a magnetic core having a set and a reset remanent state, a pair of oppositely wound input windings and a pair of oppositely wound output windings on said core, transistor multivibrator means having a first output connected to one of said input windings and a second output connected to the other of said input windings, a first transistor switch connected to one of said output windings and enabled on switching of said core to one of said states and disabled on switching of said core to the other of said states and a second transistor switch connected to the other of said output windings and enabled on switching of said core to said other state and disabled on switching of said core to said one state, wherein said first and second transistor switches each includes a transistor having emitter, base, and collector electrodes, resistor-capacitor network means connecting said bases to said output windings, and output terminals connected to said collectors for supplying two-phase output pulses to said associated load circuitry.

8. A two-phase pulse generator in accordance with claim 7 wherein said transistor multivibrator means includes a pair of transistors each having emitter, base, and collector electrodes, means including a series connected capacitor and resistor cross-connecting said multivibrator transistor collectors and bases, and means connecting said collectors to said input windings on said core.

References Cited in the file of this patent

UNITED STATES PATENTS

| | | |
|---|---|---|
| 2,978,169 | Eckert | July 2, 1957 |
| 2,846,671 | Yetter | Aug. 5, 1958 |
| 2,882,424 | Wohr | Apr. 14, 1959 |
| 2,882,482 | Simkins | Apr. 14, 1959 |
| 2,906,887 | Rosenfeld | Sept. 29, 1959 |
| 2,910,670 | Wolfe | Oct. 27, 1959 |
| 2,930,903 | Andrews | Mar. 29, 1960 |
| 2,941,090 | Lo | June 14, 1960 |

FOREIGN PATENTS

| | | |
|---|---|---|
| 506,740 | Italy | Dec. 24, 1954 |